(12) United States Patent
Popp et al.

(10) Patent No.: US 8,989,881 B2
(45) Date of Patent: Mar. 24, 2015

(54) APPARATUS AND METHOD FOR WRITING ONTO AN AUDIO CD, AND AUDIO CD

(75) Inventors: Harald Popp, Tuchenbach (DE); Stefan Geyersberger, Wuerzburg (DE); Wolfgang Fiesel, Schwanstetten (DE)

(73) Assignee: Fraunhofer Gesellschaft zur Foerderung der angewandten Forschung e.V., Munich (DE)

( * ) Notice: Subject to any disclaimer, the term of this patent is extended or adjusted under 35 U.S.C. 154(b) by 1713 days.

(21) Appl. No.: 11/465,742

(22) Filed: Aug. 18, 2006

(65) Prior Publication Data
US 2007/0121448 A1  May 31, 2007

Related U.S. Application Data

(63) Continuation of application No. PCT/EP2005/001650, filed on Feb. 17, 2005.

(30) Foreign Application Priority Data

Feb. 27, 2004  (DE) .......................... 10 2004 009 628

(51) Int. Cl.
| | | |
|---|---|---|
| G06F 17/00 | (2006.01) |
| H04R 5/00 | (2006.01) |
| G11B 20/00 | (2006.01) |
| G11B 20/10 | (2006.01) |
| G11B 20/12 | (2006.01) |

(Continued)

(52) U.S. Cl.
CPC ........ *G11B 20/10527* (2013.01); *G11B 27/034* (2013.01); *G11B 27/3063* (2013.01); *G11B 2020/10546* (2013.01); *G11B 2020/10592* (2013.01); *G11B 2220/2545* (2013.01)

USPC ............. 700/94; 381/22; 381/23; 369/47.16; 369/47.21; 369/59.25

(58) Field of Classification Search
USPC ......................................... 700/94; 381/17–23
See application file for complete search history.

(56) References Cited

U.S. PATENT DOCUMENTS 5,583,308 A * 12/1996 Owen .............................. 84/619
5,870,355 A *  2/1999 Fujihara ..................... 369/30.26
6,298,025 B1 * 10/2001 McPherson et al. ....... 369/59.21

(Continued)

FOREIGN PATENT DOCUMENTS

| DE | 40 33 993 A1 | 10/1990 |
| DE | 4033993 | 10/1990 |

(Continued)

OTHER PUBLICATIONS

Kate W.R. TH Then, et al. Digital Audio Carrying Extra Information. IEEE 1990.

*Primary Examiner* — Davetta W Goins
*Assistant Examiner* — Daniel Sellers
(74) *Attorney, Agent, or Firm* — Perkins Coie LLP; Michael A. Glenn

(57) ABSTRACT

Parametric multichannel information is written onto a normal standard audio compact disc, e.g. in the user subchannels, so that the CD enables normal stereo reproduction with a normal reproduction device, or multichannel reproduction with a supplementary device which is easy to connect and which reads out both the stereo information and the parametric multichannel information from the audio CD actually conforming with the standard, and reconstructs more than two audio channels therefrom.

11 Claims, 3 Drawing Sheets

(51) Int. Cl.
*G11B 27/034* (2006.01)
*G11B 27/30* (2006.01)

(56) References Cited

U.S. PATENT DOCUMENTS

| | | | |
|---|---|---|---|
| 6,591,392 B1 * | 7/2003 | Griffith et al. | 714/763 |
| 7,212,872 B1 * | 5/2007 | Smith et al. | 700/94 |
| 7,280,664 B2 * | 10/2007 | Fosgate et al. | 381/19 |
| 7,292,901 B2 * | 11/2007 | Baumgarte et al. | 700/94 |
| 2001/0046199 A1 | 11/2001 | McPherson et al. | |
| 2003/0026441 A1 | 2/2003 | Faller | |
| 2003/0035553 A1 | 2/2003 | Baumgarte et al. | |
| 2003/0219130 A1 | 11/2003 | Baumgarte et al. | |
| 2004/0070523 A1 * | 4/2004 | Craven et al. | 341/50 |
| 2005/0074127 A1 * | 4/2005 | Herre et al. | 381/20 |
| 2005/0195995 A1 * | 9/2005 | Baumgarte | 381/104 |
| 2006/0093164 A1 * | 5/2006 | Reams et al. | 381/119 |

FOREIGN PATENT DOCUMENTS

| | | |
|---|---|---|
| EP | 0540329 | 5/1993 |
| EP | 540330 A2 * | 5/1993 |
| JP | 03205659 A | 9/1991 |
| JP | 2003-303468 A | 10/2003 |
| JP | 2003303488 | 10/2003 |
| WO | WO03090208 | 10/2003 |

* cited by examiner

APPARATUS AND METHOD FOR WRITING ONTO AN AUDIO CD, AND AUDIO CD

CROSS-REFERENCE TO RELATED APPLICATION

This application is a continuation of copending International Application No. PCT/EP2005/001650, filed Feb. 17, 2005, which designated the United States, and was not published in English and is incorporated herein by reference in its entirety.

BACKGROUND OF THE INVENTION

1. Field of the Invention

The present invention relates to stereo audio CD technology, and in particular to apparatus and methods for writing onto audio CDs and respective methods and apparatus for retrieving data from CDs.

2. Description of Prior Art

Recently, multichannel audio reproduction technology has become increasingly important. This may be due to the fact that audio compression/coding technologies such as the prior art MP3 technology have allowed transmitting audio data via the internet or other transmission channels with a limited bandwidth. The MP3 coding technology has become so famous because of the fact that it enables all recordings to be distributed in a stereo format, i.e. in a digital representation of the audio recording, which includes a first, or left, stereo channel and a second, or right, stereo channel.

Alternative media for distributing stereo data are the prior-art audio CDs. The digital compact discs developed from the cooperation of Philips and Sony is based on contactless optical scanning, by means of laser, of a disc, which is recorded on one side, as an information carrier. In the CD player, for reading out, the beam of a semiconductor laser which is reflected by the disc and modulated in its intensity is received by a photodiode. The output signal of the photodiode is converted into a serial data signal, and the clock signal is obtained therefrom. What follows is the separation of the synchronization characters and the re-conversion of the channel code into data, test characters and control/display bits. The control/display decoder provides the signals for motor speed, focusing and track-following as well as for finding and displaying certain places in music. In the error-protection decoder, any disturbed signal information interfered with might be supplemented by means of the check bits. After separating the data stream by means of the multiplexer, the digital/analog reconversion into the analog audio signal of the left and right channels is performed.

In accordance with the standardized CD frame structure which is shared by all audio CDs with stereo information, and to which common CD players are set, there are six successive samples of the left and right channels in one frame, respectively. Transmission starts with the left channel in each case. Each 16-bits sample starts with the MSB and is divided into two audio symbols of 8 bits each. The stereo data is subjected to error protection coding with a two-step, so-called CIRC method.

Nevertheless, fundamental disadvantages of conventional 2-channel sound systems exist. Therefore, so-called surround technology has been developed. A recommended multichannel surround representation includes an additional center channel C and two surround channels Ls, Rs in addition to the two stereo channels L and R. This reference tone format is also referred to as 3/2 stereo, which means that there are three front channels and two surround channels. Generally, five transmission channels are required. In a reproduction environment, at least five loudspeakers are required at the respective five different places in order to obtain an optimum so-called "sweet spot" at a specific distance from five accurately placed loudspeakers.

In the area of CD technology, so-called DVDs have found widespread acceptance. They typically contain a complete 5.1 or 7.1 recording, i.e. a complete representation of each individual sound channel.

What is disadvantageous about DVDs, however, is the fact that specific DVD players are required for them, and that conventional audio CD players thus cannot be used to play back DVDs. In addition, there is also no possibility of upgrading such normal audio CD players with simple measures, so that they would be able to not only play back audio CDs but also DVDs.

This is unfortunate especially because there are a large number of CD players in circulation with which a multichannel reproduction cannot be achieved. On the other hand, however, many customers shy back from "sorting out" the fully functional CD player with which they are familiar and fully contented to now change to DVDs only, even though the customers might not be interested at all in the video information typically contained in the DVDs, but might simply want to have a good 5-channel sound.

It is true that coded multichannel representations obtained via the internet or from other sources might be burned onto CDs, provided that no licensing rights are violated. But such burned CDs, too, are not compatible with normal CD players since they contain coded information, whereas the stereo data contained on the audio CDs is merely uncompressed 16-bits PCM data which is merely subjected to error protection coding, which leads to an increase of the data rate, rather than being subjected to data compression, which would lead to a reduction in the data rate.

Thus, in technology there are many techniques for reducing the amount of data required for transmitting a multichannel audio signal. Such techniques are referred to as joint stereo techniques. To this end, reference shall be made to FIG. 3 which depicts a joint stereo apparatus 60. This apparatus may be an apparatus which implements, for example, intensity stereo (IS) technique or binaural cue coding technique (BCC). Such a device typically receives, as the input signal, at least two channels CH1, CH2, ..., CHn, and outputs one single carrier channel as well as parametric multichannel information. The parametric data is defined such that an approximation of an original channel (CH1, CH2, ..., CHn) may be calculated in a decoder.

Normally, the carrier channel will include subband samples, spectral coefficients, time domain samples, etc. which provide a relatively fine representation of the underlying signal, whereas the parametric data includes no such samples or spectral coefficients but includes control parameters for controlling a certain reconstruction algorithm, such as weighting by multiplying, by time-shifting, by frequency-shifting, etc. The parametric multichannel information therefore includes a relatively coarse representation of the signal or of the associated channel. In numbers, the amount of data required by a carrier channel is an amount from about 60 to 7o kbits/s, whereas the amount of data required by parametric side information for a channel ranges between 1.5 and 2.5 kbits/s. It shall be noted that the above numbers apply to compressed data. Naturally, a non-compressed CD channel requires data rates in the range of about 10 times the said amount. An example of parametric data are the prior-art scale factors, intensity stereo information or BCC parameters, as will be set forth below.

The technique of intensity stereo coding is described in the AES preprint 3799, "Intensity Stereo Coding", J. Herre, K. H. Brandenburg, D. Lederer, February 1994, Amsterdam. Generally, the concept of intensity stereo is based on a main axis transformation to be performed on data of both stereophonic audio channels. When most data points are concentrated around the first main axis, a coding gain may be achieved in that both signals are rotated by a certain angle before the coding takes place. However, this is not always given for real stereophonic reproduction techniques. Therefore, this technique is modified to the effect that the second orthogonal component is excluded from the transmission in the bitstream. Thus, the reconstructed signals for the left and right channels consist of differently weighted or scaled versions of the same signal transmitted. Nevertheless, the reconstructed signals differ with regard to their amplitudes, but they are identical with regard to their phase information. The energy/time envelopes of both original audio channels, however, are maintained by the selective scaling operation which typically operates in a frequency-selective manner. This corresponds to human perception of sound at high frequencies, where the dominant spatial information is determined by the energy envelopes.

In practical implementations, the signal transmitted, i.e. the carrier channel, is additionally generated from the aggregate signal of the left and right channels rather than the rotation of both components. In addition, this processing, i.e. the generation of intensity stereo parameters, is performed, for performing the scaling operations, in a frequency-selective manner, i.e. independently for each scale factor band, i.e. for each coder frequency partition. Preferably, both channels are combined to form a combined, or "carrier", channel and, in addition to the combined channel, the intensity stereo information. The intensity stereo information depends on the energy of the first channel, the energy of the second channel or the energy of the combined channel.

The BCC technique is described in the AES Convention Paper 5574 "Binaural Cue Coding applied to stereo and multichannel audio compression", T. Faller, F. Baumgarte, May 2002, Munich. In BCC coding, a number of audio input channels are converted into a spectral representation, specifically using a DFT-based transformation with overlapping windows. The resulting spectrum is partitioned into non-overlapping portions, each of which has an index. Each partition has a bandwidth proportional to the equivalent square bandwidth (ERB). The inter channel level differences (ICLD) and the inter channel time differences (ICTD) are determined for each partition and for each frame k. The ICLD and ICTD are quantized and coded so as to pass, eventually, into a BCC bitstream as side information. The inter channel level differences and the inter channel time differences are given in relation to a reference channel for each channel. Subsequently, the parameters are calculated in accordance with predetermined formulae which depend on the specific partitions of the signal to be processed.

On the decoder side, the decoder typically receives a mono signal and the BCC bitstream. The mono signal is transformed into the frequency domain and is input into a spatial synthesis block which also receives decoded ICLD and ICTD values. In the spatial synthesis block, the BCC parameters (ICLD and ICTD) are used to perform a weighting operation of the mono signal to synthesize those multichannel signals which, after a frequency/time conversion, represent a reconstruction of the original multichannel audio signal.

In the case of BCC, the joint stereo module 60 is operative to output the channel-side information such that the parametric channel data is quantized and coded ICLD or ICTD parameters, one of the original channels being used as a reference channel for coding the channel-side information.

Normally, the carrier signal is formed from the sum of the participating original channels.

Naturally, the above techniques provide only a mono representation for a decoder which can process the carrier channel only but is not able to process the parametric data for generating one or several approximations of more than one input channel.

The BCC technique is also described in the US patent publications US 2003/0219130 A1, US 2003/0026441 A1 and US 2003/0035553 A1. In addition, reference shall be made to the specialist publication "Binaural Cue Coding. Part II: Schemes and Applications", T. Faller and F. Baumgarte, IEEE Trans. On Audio and Speech Proc. Vol. 11, No. 6, November 2003.

A typical BCC scheme for multichannel audio coding will be represented in more detail below, specifically with reference to FIGS. 4 to 6.

FIG. 5 shows such a BCC scheme for coding/transmitting multichannel audio signals. The multichannel audio input signal at an input 110 of a BCC coder 112 is downmixed in a so-called downmix block 114. In this example, the original multichannel signal at the input 110 is a 5-channel surround signal with a front left channel, a front right channel, a left surround channel, a right surround channel and a center channel. In the preferred embodiment of the present invention, downmix block 114 generates an aggregate signal by simply adding up these five channels into a mono signal.

Other downmixing schemes are known in the art, so that using a multichannel input signal results in a downmix channel having a single channel. This single channel is output at an aggregate-signal line 115. A piece of side information obtained from the BCC analysis block 116 is output on a side information line 117.

In the BCC analysis block inter channel level differences (ICLD) and inter channel time difference (ICTD) are calculated as has been represented above. As of late, the BCC analysis block 116 is also able to calculate inter channel correlation values (ICC values). The aggregate signal and the side information are transmitted to a BCC decoder 120 in a quantized and coded format. The BCC decoder decomposes the transmitted aggregate signal into a number of subbands and performs scalings, delays and other processing steps to supply the subbands of the multichannel audio channels to be output. This processing is performed such that the ICLD, ICTD and ICC parameters (cues) of a reconstructed multichannel signal at the output 121 match the respective cues for the original multichannel signal at the input 110 in the BCC coder 112. For this purpose, BCC decoder 120 includes a BCC synthesis block 122 and a side information revision block 123.

The internal structure of the BCC synthesis block 122 will be represented below with reference to FIG. 6. The aggregate signal on line 115 is fed to a time/frequency conversion unit or filter bank FB 125. At the output of block 125, there are a number N of subband signals or, in an extreme case, a block of spectral coefficients when the audio filter bank 125 performs a 1:1 transformation, i.e. a transformation generating N spectral coefficients from N time domain samples.

The BCC synthesis block 122 further includes a delay stage 126, a level modification stage 127, a correlation processing stage 128 and an inverse filter bank stage IFB 129. At the output of stage 129, the reconstructed multichannel audio signal having, for example, five channels in the event of a 5-channel surround system, may be output to a set of speakers 124 as are represented in FIG. 5 or FIG. 4.

The input signal sn is converted to the frequency range or the filter bank range by means of the element 125. The signal output by element 125 is copied such that several versions of the same signal will be obtained, as is represented by the copying node 130. The number of versions of the original signal equals the number of output channels in the output signal. Then each version of the original signal is subjected, at node 130, to a certain delay $d_1, d_2, \ldots, d_i, \ldots d_N$. The delay parameters are calculated by the side information processing block 123 in FIG. 5 and are derived from the inter channel time differences as have been calculated by the BCC analysis block 116 of FIG. 5.

The same applies to multiplication parameters $a_1, a_2, \ldots, a_i, \ldots, a_N$ which are also calculated by the side information processing block 123 on the basis of the inter channel level differences as are calculated by BCC analysis block 116.

The ICC parameters calculated by the BCC analysis block 116 are used for controlling the functionality of block 128, so that certain correlations between the signals which are delayed and manipulated in their levels are obtained at the outputs of block 128. It shall be noted here that the order of stages 126, 127, 128 may deviate from the order shown in FIG. 6.

It shall be pointed out that with frame-wise processing of the audio signal, the BCC analysis is also performed in a frame-wise, i.e. temporally variable, manner and that, in addition, a frequency-wise BCC analysis is obtained, as may be seen from the filter band partitioning from FIG. 6. This means that the BCC parameters are obtained for each spectral band. This means further that in the event that the audio filter bank 125 decomposes the input signal into, for example, 32 bandpass signals, the BCC analysis block will obtain a set of BCC parameters for each of the 32 bands. Of course, BCC synthesis block 122 of FIG. 5, depicted in detail in FIG. 6, performs a reconstruction which is also based on the 32 bands mentioned by way of example.

With reference to FIG. 4, a scenario will be presented below which is used to determine individual BCC parameters. Normally, the ICLD, ICTD and ICC parameters may be defined between pairs of channels. However, it is preferred to determine the ICLD and ICTC parameters between a reference channel and any other channel. This is depicted in FIG. 4A.

ICC parameters may be defined in various manners. Generally speaking, ICC parameters in the coder may be determined between all possible pairs of channels, as is shown in FIG. 4B. However, it has been proposed to calculate only ICC parameters between the two most powerful channels at any time, as is shown in FIG. 4C, which depicts an example wherein an ICC parameter between channels 1 and 2 is calculated at one time, and an ICC parameter between channels 1 and 5 is calculated at another time. Subsequently, the decoder synthesizes the inter channel correlation between the most powerful channels in the decoder and uses certain heuristic rules for calculating and synthesizing the inter channel coherence for the remaining pairs of channels.

With regard to calculating, for example, the multiplication parameters $a_1, a_N$ on the basis of the ICLD parameters transmitted, reference shall be made to the AES convention paper No. 5574. The ICLD parameters represent an energy distribution of an original multichannel signal. Without loss of generality, it is preferred, as depicted in FIG. 4A, to take four ICLD parameters which represent the energy difference between the respective channels and the front left channel. In the side information processing block 122, the multiplication parameters $a_1, \ldots, a_N$ are derived from the ICLD parameters in such a manner that the entire energy of all reconstructed output channels is the same (or is proportional to the energy of the aggregate signal transmitted).

In order to put multichannel information onto CDs, one may also fall back, beside the DVDs provided, to special audio CDs which store the sound channels in a data-reduced form using audio coding methods such as DTS. These special audio CDs cannot be played back on normal audio CD players, but require a decoder of their own which in most cases is to be connected externally to the digital output of the normal audio CD player.

In addition, there are hybrid SACDs which offer, by means of two layers on the CD, both the conventional stereo sound for reproduction on audio CD players (in one of the layers) and the multichannel sound in the DSC format (in the other layer) for reproduction on SACD players.

SUMMARY OF THE INVENTION

It is the object of the present invention to provide a flexible concept for spreading and generating multichannel audio data, the concept potentially achieving a high level of market acceptance.

In accordance with a first aspect, the invention provides an apparatus for writing audio information, from which a multichannel audio representation may be reconstructed, onto a compact disc, the apparatus having:
a writer for writing parametric multichannel information onto one or several locations of the CD which are not used for two base channels including a two-channel representation of the audio information, the parametric multichannel information being configured such that, together with the two base channels, it enables a multichannel audio representation with more than two audio channels.

In accordance with a second aspect, the invention provides a compact disc including audio information, the audio information including two base channels and parametric multichannel information, wherein the multichannel information is written onto locations on the compact disc which are not taken up by the two base channels, the parametric multichannel information being configured such that, together with the two base channels, it enables a multichannel audio representation with more than two audio channels.

In accordance with a third aspect, the invention provides an apparatus for playing back a compact disc with audio information, the audio information including two base channels and parametric multichannel information, wherein the multichannel information is written onto locations on the compact disc which are not taken up by the two base channels, the parametric multichannel information being configured such that, together with the two base channels, it enables a multichannel audio representation with more than two audio channels, the apparatus having:
a reader for reading out the two base channels and for reading out the parametric multichannel information; and
a reconstructor for reconstructing a multichannel representation on the basis of the two base channels and the parametric multichannel information.

In accordance with a fourth aspect, the invention provides a method for writing audio information, from which a multichannel audio representation may be reconstructed, onto a compact disc, the method including the steps of:
writing parametric multichannel information to one or several locations of the CD which are not provided for two base channels which include a two-channel representation of the audio information, the parametric multichannel information being configured such that, together with the two base channels, it enables a multichannel audio representation with more than two audio channels.

In accordance with a fifth aspect, the invention provides a method for playing back a compact disc with audio information, the audio information including two base channels and parametric multichannel information, wherein the multichannel information is written onto locations on the compact disc which are not taken up by the two base channels, the parametric multichannel information being configured such that, together with the two base channels, it enables a multichannel audio representation with more than two audio channels, the method including the steps of:

reading out the two base channels and reading out the parametric multichannel information; and reconstructing a multichannel representation on the basis of the two base channels and the parametric multichannel information.

In accordance with a sixth aspect, the invention provides a computer program having a program code for performing the method for writing audio information, from which a multichannel audio representation may be reconstructed, onto a compact disc, the method including the steps of:

writing parametric multichannel information to one or several locations of the CD which are not provided for two base channels which include a two-channel representation of the audio information, the parametric multichannel information being configured such that, together with the two base channels, it enables a multichannel audio representation with more than two audio channels, when the program runs on a computer.

In accordance with a seventh aspect, the invention provides a computer program having a program code for performing the method for playing back a compact disc with audio information, the audio information including two base channels and parametric multichannel information, wherein the multichannel information is written onto locations on the compact disc which are not taken up by the two base channels, the parametric multichannel information being configured such that, together with the two base channels, it enables a multichannel audio representation with more than two audio channels, the method including the steps of:

reading out the two base channels and reading out the parametric multichannel information; and reconstructing a multichannel representation on the basis of the two base channels and the parametric multichannel information, when the program runs on a computer.

The present invention is based on the findings that on a common audio CD in accordance with the normal CD format, subchannels are provided which are defined in accordance with the CD standard to transmit meta information, such as data and text and/or a video image. In accordance with the invention, these subchannels are utilized for also writing parameter information onto the normal stereo audio CD so that a normal stereo audio CD includes sufficient information for multichannel reproduction.

One advantage of this concept is that it is compatible with common CD players. Common CD players then will continue to provide a stereo sound representation of the normal audio CD stereo data which is not influenced by the inventive concept. However, if a CD player is equipped in accordance with the invention, i.e. with a small supplementary module which receives, at the CD player on the output side, the stereo data in addition to the subchannel data, i.e. the multichannel parameter data, and calculates the parameter data and the stereo data with one another using the underlying reconstruction algorithm, a multichannel representation of the original multichannel signal will be provided.

This is to achieve that a user may keep his/her normal CD player which he/she has got used to and with which he/she is satisfied and, for reading the multichannel audio CDs, will require only the supplementary module which, however, may readily be connected to the CD player since each CD player has a stereo output. Thus, the supplementary module need not intervene in the CD player but may simply be plugged in at the terminal which is provided by the CD player anyway. Preferably this terminal, or output, of the CD player is a digital output. However, if a CD player has an analog output only, which may be the case with very old models, one would additionally require an analog/digital converter in the supplementary multichannel module.

In addition, the present invention is advantageous in that the CD is backward-compatible in a backward-compatible recording of the multichannel information, i.e. that it may also be played back on a stereo CD player of a conventional type. The inventive CD may thus be played back both on a normal CD player and on a CD player expanded to a multichannel CD player.

Alternatively, the multichannel parameter information may also be accommodated in other places of the audio CD which are not occupied by the two-channel representation, for example in a still vacant location of the CD, on a data partition of a hybrid CD, in a separate session at the end of the CD, etc.

It is preferred, however, to "hide" the parameter data onto the subchannels already provided by the normal audio CD standard anyway because no interventions in CDs whatsoever are planned and because the CDs fully comply with the standard despite having multichannel sound information now, and because they thus do not cause any problems in playback devices.

The inventive concept is further advantageous in that the amount of data is sufficiently compressed due to the multichannel information being represented by parametric multichannel data, so that the channel capacity of the subchannels on the CD is sufficiently large. Of course, it would not be possible to store, on these subchannels, any non-parameter information as are found on DVDs.

A further advantage of the present invention is that existing CD writing devices can be used, since anyway they have already been designed to write data into the user subchannels. Moreover, existing CD playback devices may be used which are designed for reading from subchannels.

Thus, a stereo CD may be turned into a multichannel CD having at least 3 and preferably 5, 7 or still more channels at minimum expense on the part of the CD manufacturer, with regard to the CD itself as well as on the part of the user. All of this is achieved using the tried and tested audio CD technology which has been refined, well-tried and accepted for years, which is something that cannot be said without reserve for recent technologies, in particular in the field of DVDs.

BRIEF DESCRIPTION OF THE DRAWINGS

These and other objects and features of the present invention will become clear from the following description taken in conjunction with the accompanying drawing, in which.

DESCRIPTION OF PREFERRED EMBODIMENTS

Figure 1:
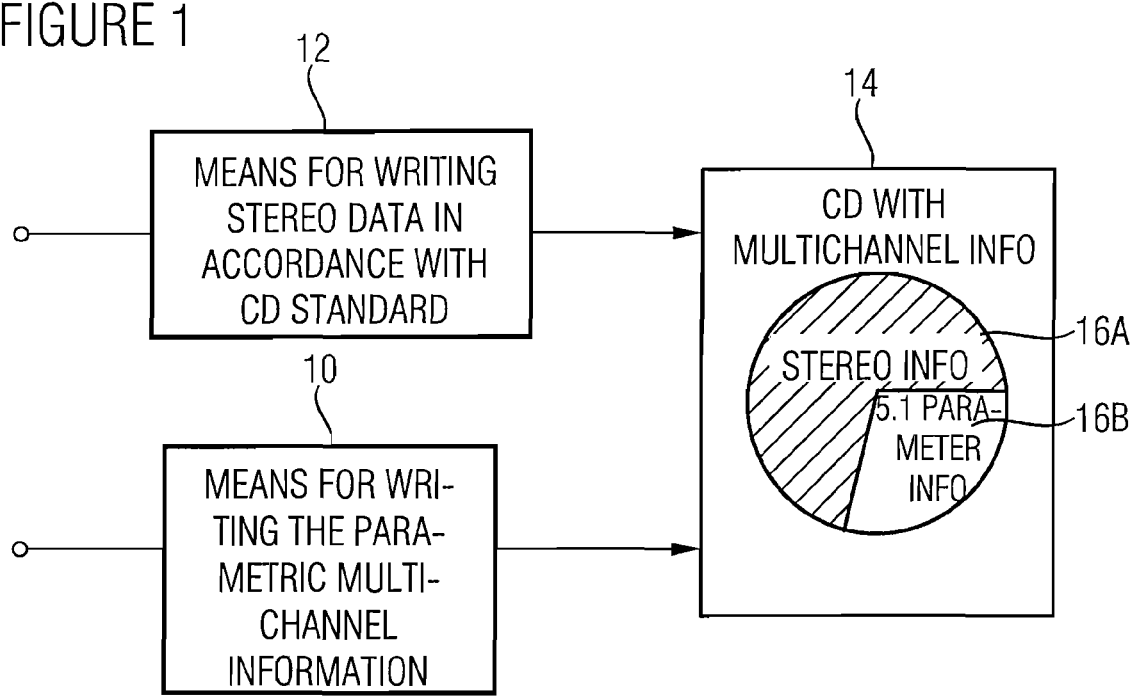
FIG. 1 is a block diagram of the inventive apparatus for writing onto a compact disc.

FIG. 1 shows an inventive apparatus for writing audio information from which a multichannel audio representation may be reconstructed onto a compact disc using a means for writing parametric multichannel information at one or several locations of the CD which are not provided for two base channels which include a two-channel representation of the audio information.

In particular, the parametric multichannel information which is not written onto the CD by means 10 is configured such that it enables, along with the two base channels, a multichannel audio representation with more than two audio channels. Preferably, a parametric multichannel information is BCC parameters or intensity stereo parameters or other parametric data which, unlike the two stereo base channels, is merely a coarse representation of a channel of the original multichannel audio signal.

Depending on the embodiment, the CD is equipped with the parametric multichannel information with normal stereo data already before being written onto. This would be the case if the multichannel information were subsequently written onto the CD. However, it is preferred to introduce unwritten audio CDs into the inventive apparatus for writing, such that the inventive apparatus comprises also a means 12 for writing stereo data in accordance with the CD standard. For reasons of illustration only, the two means for writing are depicted as separate means in FIG. 1. Naturally, they may be implemented by the same physical CD writing device.

The product of the inventive apparatus is a CD 14 including the absolutely normal stereo base channels in locations on the CD which are provided for the stereo information, as is depicted at 16*a*. However, in contrast to a normal CD, multichannel parameter information such as 5.1 parameter information, 7.1 parameter information, etc. is present at locations to which the stereo information has not been written, i.e. at a location 16*b*. This parameter information is preferably BCC parameter data, as has already been set forth.

In a preferred embodiment of the present invention, the parameter data is stored, synchronously with the normal stereo data, in a sector-by-sector manner on the audio CD in the "subchannels" R, 1, T, U, V, W available on the audio CD. A description of the subchannels and of the CD data format is found in the textbook "Audio-Handbuch der Schaltungstechnik", Paul Skritek, Franzis-Verlag, 1988, chapter 17 "Kompakt-Disk-Technik", pages 329-338.

Normally, these subchannels are intended to store information about the CD, including the table of contents and the current time of the track for the indication of the reproduction device. Alternatively, these channels may also be used to store graphical representations with low resolutions and output them on respective reproduction devices. These subchannels, or the sub-codes stored on the subchannels, may also be used to store additional information as is required, for example, for karaoke CDs.

In accordance with the invention, however, these subchannels are now used to "upgrade" the payload data itself, i.e. the stereo basis information, in that parametric multichannel information is stored in the subchannels. In terms of the data rate, the gross data rate available amounts to 7.36 kbps. Since there are six user data channels available, a total data rate of 44.1 kbps is thus available. This is a value which is even higher than the amount of data typically required by the BCC parameters, which for 5.1 multichannel information is only about half the available bit rate of 44.1 kbps. The entire space in the subchannels would be required for 10.1 multichannel information.

In a preferred embodiment of the present invention, an error protection coding is therefore used to subject the additional data, which is not normally not error-protection coded, to an error-protection coding before it is written into the subchannels, the error-protection coding being undone during playback, and serving, in particular, to correct read-out errors.

Figure 2:
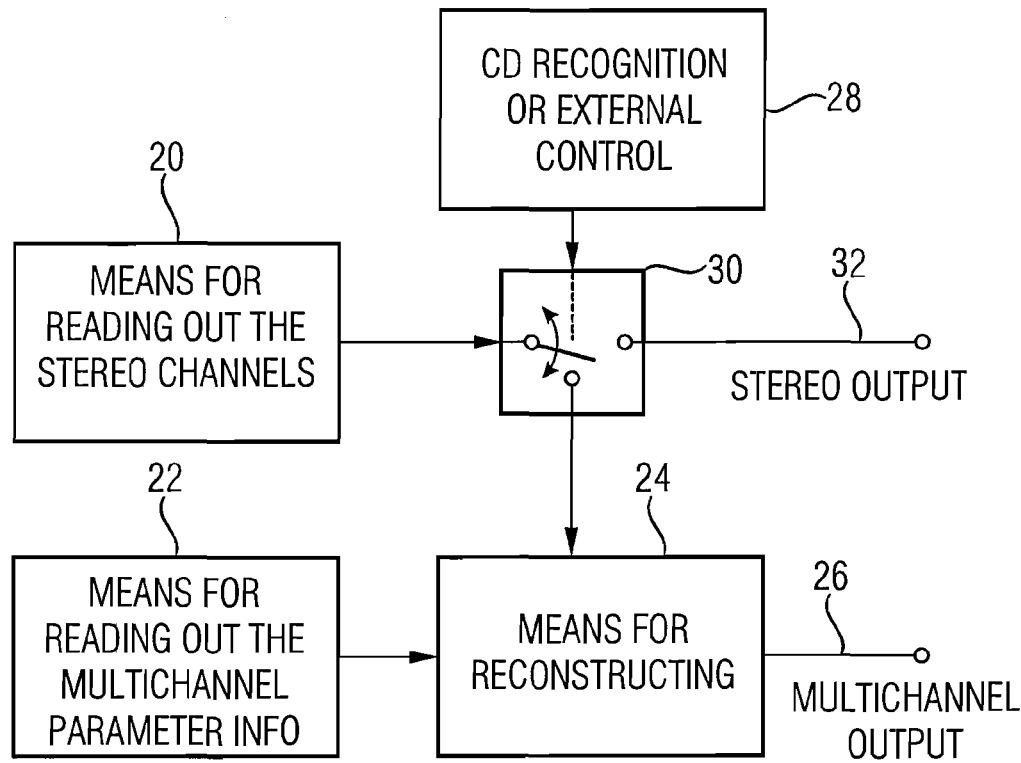
FIG. 2 is a block diagram of an inventive apparatus for playing back a compact disc.
Figure 3:
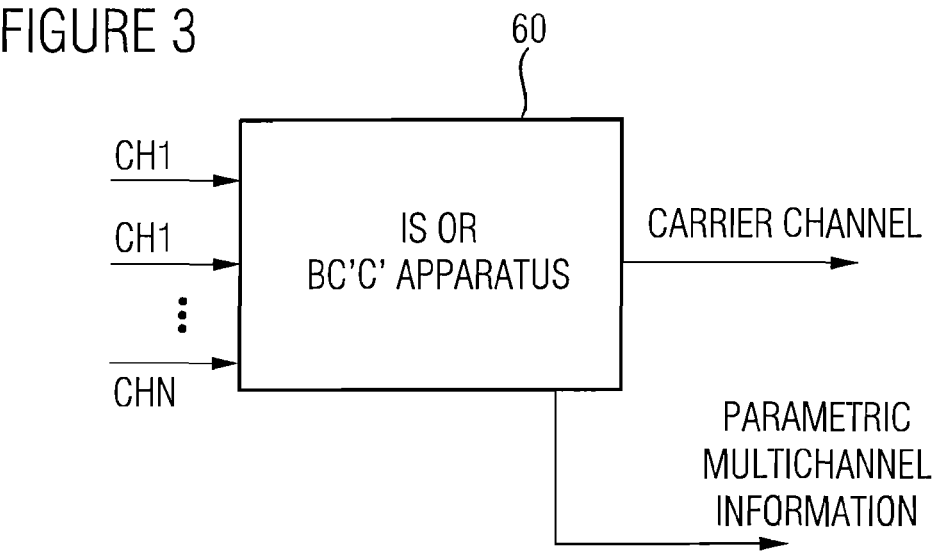
FIG. 3 is a prior art joint stereo coder for generating channel data and parametric multichannel information.
Figure 4:
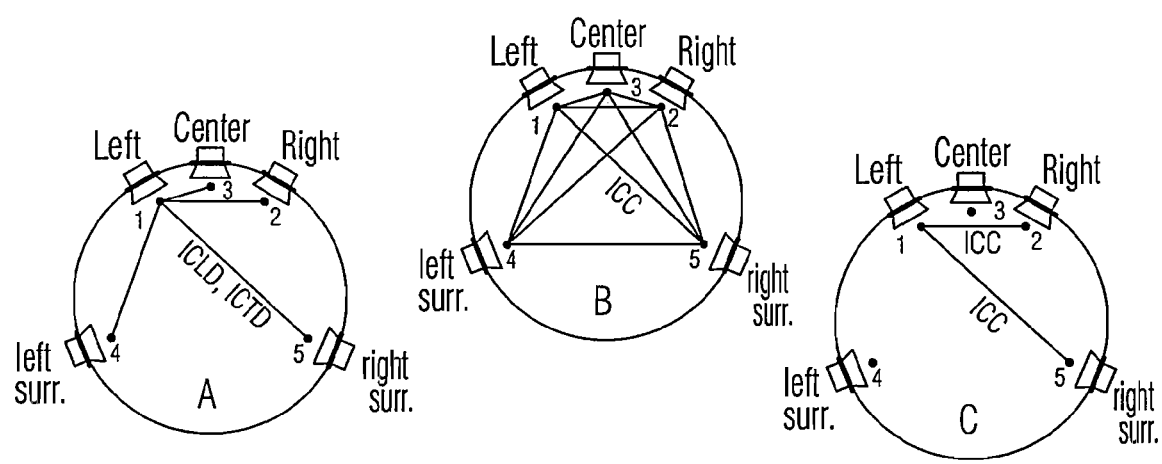
FIG. 4 is a representation of a scheme for determining ICLD, ICTD and ICC parameters.
Figure 5:
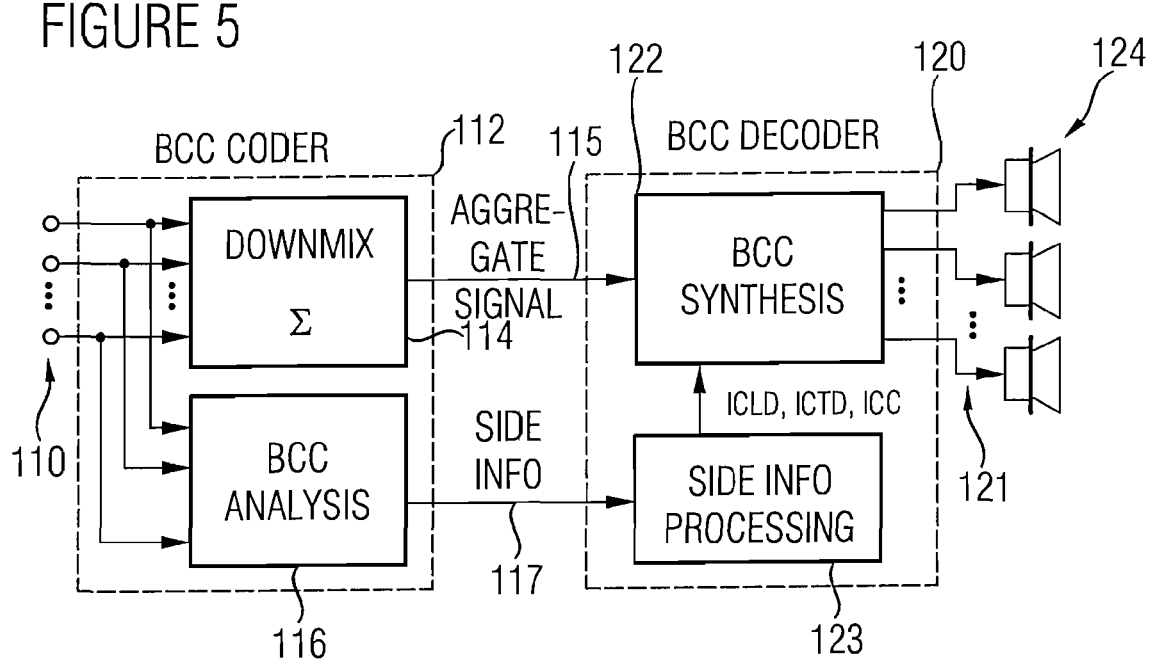
FIG. 5 is a block diagram representation of a BCC coder/decoder chain.
Figure 6:
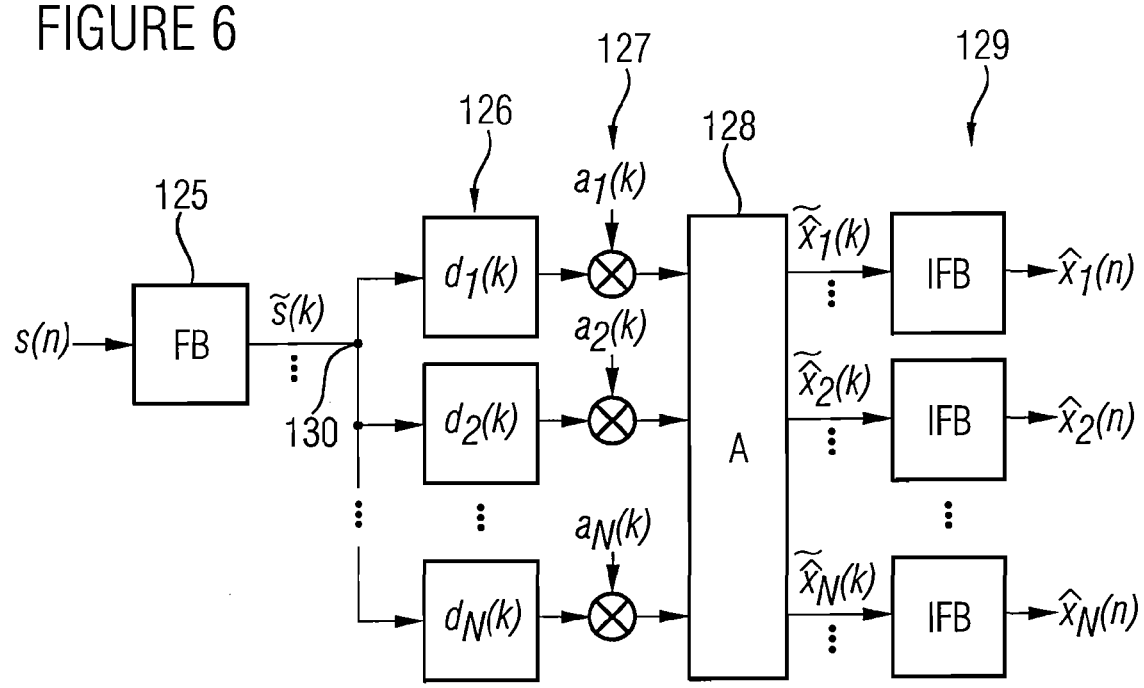
FIG. 6 is a block diagram of an implementation of the BCC synthesis block of FIG. 5.

FIG. 2 shows an inventive reproduction device initially including, like a normal CD player, a means 20 for reading out the stereo channels. However, in addition to a normal CD player, a means 22 for reading out the multichannel parameter information is provided which, however, is only a supplementary means, if the CD player is not yet configured to read out the subchannels, or if the parameter information is stored at other locations of the CD, i.e. is not stored at the subchannels but at one or several separate sessions at the end of the CD or in a data domain of a hybrid CD and/or hybrid partition, etc.

Connected downstream from means 22 is a means 24 for reconstructing a multichannel output which is provided at a multichannel output 26. In addition, a CD recognition means or an external control 28 which is manual or taken over by another device is provided for actuating a changeover switch 30. If it is recognized that the CD includes stereo information only, the output of means 20 for reading out the stereo channels will be directly switched through to a stereo output 32 by switch 30. If the CD recognition means 28 recognizes, however, that what is dealt with is an audio CD with multichannel data, e.g. in the subchannels, the output of means 20 for reading out the stereo channels will be switched over by switch 30 and fed to means 24 for reconstructing, such that a multichannel output is generated, and such that no or only one additional stereo output is provided at output 32.

It shall be noted that switch 30 in FIG. 2 may also be replaced by a branching, so that both the normal stereo signal (e.g. via an analog output of the player or via a first digital output of the player) and the stereo signal including the multichannel information may be output in parallel via a digital output which is normally present with CD players and is provided for this purpose. The inventive expansion box is mounted at this digital output, the expansion box then outputting, on the output side, the reconstructed multichannel sound with more than two channels.

Such a playback device is thus capable of a stereophonic reproduction or, when decoding the parametric multichannel data, of reproducing a sound with more than two channels, i.e., for example, a 5.1 surround sound.

Depending on the circumstances, the inventive method for writing onto a compact disk or for playing back a compact disk may be implemented in hardware or in software. Implementation may occur on a digital storage medium, in particular a disk or CD with electronically readable control signals which can interact with a programmable computer system such that the method is performed. Generally, the invention thus also consists in a computer program product with a program code, stored on a machine-readable carrier, for performing an inventive method, when the computer program product runs on a computer. In other words, the invention may thus be realized as a computer program having a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for writing audio information, from which a multichannel audio representation may be reconstructed, onto a compact disc (CD), the apparatus comprising:
    a writer for writing parametric multichannel information onto one or several locations of the CD which are not used for two stereo audio channels including a two-channel stereo representation of the audio information, the parametric multichannel information being configured such that, together with the two stereo audio channels, the multichannel audio representation with more than two audio channels is enabled,
    wherein the parametric multichannel information comprises binaural cue parameters or intensity stereo parameters,
    wherein the CD already has the stereo audio channels written on the CD, before the parametric multichannel information is written by the writer, or
    wherein the writer is further configured to write, starting from a CD without audio information, both the two stereo audio channels and the parametric multichannel information,
    wherein the stereo audio channels are written in accordance with the CD standard on the CD so that a reproduction of the two stereo audio channels in stereo is possible using a CD reproduction device configured in accordance with the CD standard, and
    wherein a reproduction of the multichannel audio representation using the two-channel stereo representation and the parametric multichannel information is not possible using a CD reproduction device configured in accordance with the CD standard.

2. The apparatus as claimed in claim 1, wherein the writer includes a coder for error-protection coding the parametric multichannel information, so that the writer is configured to write error-protection coded parametric multichannel information onto the compact disc.

3. The apparatus as claimed in claim 1, wherein the writer is configured to write the parametric multichannel information into an R, S, T, U, V or W subchannel in accordance with the CD standard.

4. The apparatus as claimed in claim 1, wherein the writer is configured to write the parametric multichannel information onto a free area following an end or prior to a beginning of a data recording taken up by the two stereo audio channels.

5. The apparatus as claimed in claim 1, wherein the CD is a hybrid CD with a data domain, and wherein the writer is configured to write the parametric multichannel information into the data domain of the CD, whereas the stereo audio channels are written in an audio CD area.

6. A compact disc (CD) comprising audio information, the audio information including two stereo audio channels and parametric multichannel information, wherein the multichannel information is written onto locations on the compact disc which are not taken up by the two stereo audio channels, the parametric multichannel information being configured such that, together with the two stereo audio channels, it enables a multichannel audio representation with more than two audio channels,
    wherein the parametric multichannel information comprises binaural cue parameters or intensity stereo parameters,
    wherein the stereo audio channels are written in accordance with the CD standard on the CD so that a reproduction of the two stereo audio channels in stereo is possible using a CD reproduction device configured in accordance with the CD standard, and
    wherein a reproduction of the multichannel audio representation using the two-channel stereo representation and the parametric multichannel information is not possible using a CD reproduction device configured in accordance with the CD standard.

7. An apparatus for playing back a compact disc (CD) comprising:
    a reader for reading the compact disk, the compact disk comprising
        audio information, the audio information including two stereo audio channels and parametric multichannel information,
        wherein the parametric multichannel information is written onto locations on the compact disc which are not taken up by the two stereo audio channels,
        the parametric multichannel information being configured such that, together with the two stereo audio channels, it enables a multichannel audio representation with more than two audio channels,
        wherein a reproduction of the multichannel audio representation using the two-channel stereo representation and the parametric multichannel information is not possible using a CD reproduction device configured in accordance with the CD standard,
        wherein the parametric multichannel information comprises binaural cue parameters or intensity stereo parameters,
        wherein the reader is configured for obtaining the two stereo audio channels and the parametric multichannel information; and
    a reconstructor for reconstructing the multichannel audio representation on the basis of the two stereo audio channels and the parametric multichannel information.

8. A method for writing audio information, from which a multichannel audio representation may be reconstructed, onto a compact disc (CD), the method comprising:
    writing parametric multichannel information to one or several locations of the CD which are not provided for two stereo audio channels which include a two-channel representation of the audio information, the parametric multichannel information being configured such that, together with the two stereo audio channels, it enables a multichannel audio representation with more than two audio channels,
    wherein the parametric multichannel information comprises binaural cue parameters or intensity stereo parameters,
    wherein the CD already has the stereo audio channels written on the CD, before the parametric multichannel information is written, or
    wherein, starting from a CD without audio information, both the two stereo audio channels and the parametric multichannel information are written,
    wherein the stereo audio channels are written in accordance with the CD standard on the CD so that a reproduction of the two stereo audio channels in stereo is possible using a CD reproduction device configured in accordance with the CD standard, and wherein a reproduction of the multichannel audio representation using the two-channel stereo representation and the parametric multichannel information is not possible using a CD reproduction device configured in accordance with the CD standard.

9. A method for playing back a compact disc (CD) comprising:

reading the compact disk, the compact disk comprising
audio information, the audio information including two stereo audio channels and parametric multichannel information,
wherein the parametric multichannel information is written onto locations on the compact disc which are not taken up by the two stereo audio channels,
the parametric multichannel information being configured such that, together with the two stereo audio channels, it enables a multichannel audio representation with more than two audio channels,
wherein a reproduction of the multichannel audio representation using the two-channel stereo representation and the parametric multichannel information is not possible using a CD reproduction device configured in accordance with the CD standard, and
wherein the parametric multichannel information comprises binaural cue parameters or intensity stereo parameters,
wherein the reader is configured for obtaining the two stereo audio channels and the parametric multichannel information; and
reconstructing the multichannel audio representation on the basis of the two stereo audio channels and the parametric multichannel information.

10. A digital storage medium having stored thereon a computer program having a program code for performing, when the program runs on a computer, the method for writing audio information, from which a multichannel audio representation may be reconstructed, onto a compact disc, the method comprising:

writing parametric multichannel information to one or several locations of the CD which are not provided for two stereo audio channels which include a two-channel representation of the audio information, the parametric multichannel information being configured such that, together with the two stereo audio channels, it enables a multichannel audio representation with more than two audio channels,
wherein the parametric multichannel information comprises binaural cue parameters or intensity stereo parameters,
wherein the CD already has the stereo audio channels written on the CD, before the parametric multichannel information is written, or
wherein, starting from a CD without audio information, both the two stereo audio channels and the parametric multichannel information are written,
wherein the stereo audio channels are written in accordance with the CD standard on the CD so that a reproduction of the two stereo audio channels in stereo is possible using a CD reproduction device configured in accordance with the CD standard, and
wherein a reproduction of the multichannel audio representation using the two-channel stereo representation and the parametric multichannel information is not possible using a CD reproduction device configured in accordance with the CD standard.

11. A digital storage medium having stored thereon a computer program having a program code for performing a method for playing back a compact disc, the method comprising:

reading the compact disk, the compact disk comprising
audio information, the audio information including two stereo audio channels and parametric multichannel information,
wherein the parametric multichannel information is written onto locations on the compact disc which are not taken up by the two stereo audio channels,
the parametric multichannel information being configured such that, together with the two stereo audio channels, it enables a multichannel audio representation with more than two audio channels,
wherein a reproduction of the multichannel audio representation using the two-channel stereo representation and the parametric multichannel information is not possible using a CD reproduction device configured in accordance with the CD standard, and
wherein the parametric multichannel information comprises binaural cue parameters or intensity stereo parameters,
wherein the reader is configured for obtaining the two stereo audio channels and the parametric multichannel information; and
reconstructing the multichannel audio representation on the basis of the two stereo audio channels and the parametric multichannel information,
when the program runs on a computer.

* * * * *